July 27, 1943.  W. B. WAIT  2,325,451
SIGNAL RECORDING
Filed Sept. 17, 1940
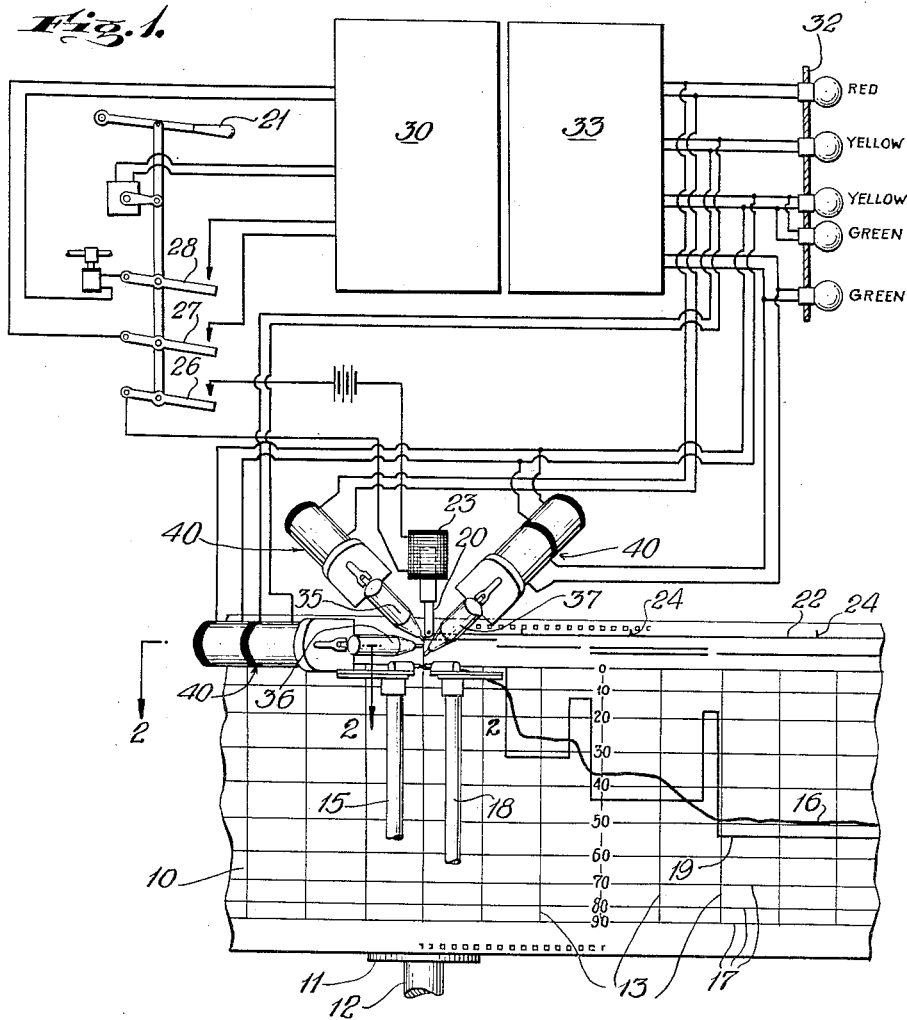
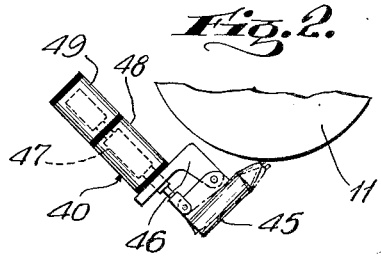
INVENTOR
WILLIAM BELL WAIT
BY
ATTORNEY Patented July 27, 1943

2,325,451

UNITED STATES PATENT OFFICE 2,325,451

SIGNAL RECORDING

William Bell Wait, New York, N. Y.

Application September 17, 1940, Serial No. 357,095

7 Claims. (Cl. 246—185)

This invention relates to improvements in recording of signals.

Among the objects of this invention are improved means for recording signals and preferably for recording such signals as they are produced in a cab on a locomotive, for recording such signals in colors corresponding to the colors of the signals which may be operated singly or in combination, and for recording such signals on a distance tape on which are recorded the speed of the locomotive, position of the cut-out, forestalling operations, and any other such items of information as it may be desired to record, all of such recordings being properly associated with each other and with respect to the tape so that they may be identified with points along the right of way.

Other objects of the invention will appear from the following description taken in connection with the drawing, in which—

Fig. 1 is a diagrammatic view of the general arrangement of devices included in a system constructed in accordance with my invention; and Fig. 2 is a side view of one of the recording devices that may be operated singly and/or in combination.

For the purpose of disclosing my invention (and reference is here made to the patent to Caracristi 1,627,076 May 3, 1927), I have shown in Fig. 1 a tape 10 which may be driven by a sprocket platen roll 11 on a shaft 12 driven from the driver of the locomotive by means well known in this art so that the tape travels distances in proportion to the distance traveled by the locomotive. This tape is divided into lengths of ½" by cross lines 13, the rate of feed of the tape being such that the tape will be fed ½" for each mile traveled by the locomotive. Cooperating with the tape is a speed recording pencil 15 which is controlled by a governor, not shown, driven from the drive wheel of the locomotive to make the speed curve 16 the tape being marked by longitudinally extending lines 17 to indicate speeds from zero to a speed such as 90 miles per hour. The position of the cut-off mechanism is recorded by a pencil 18 which is positioned by the cut-off lever and which makes the line 19 which indicates the position of the cut-off lever on the tape in a line substantially transversely of the point on the speed curve indicating the speed of the locomotive at that time.

In my application Ser. No. 234,069 filed October 8, 1938, I disclose a pencil 20 for marking on the tape each operation of a forestalling lever 21. In the present application the pencil is shown in continuous contact with the tape making a line 22 as close to the upper edge of the tape as is permissible and a solenoid 23 is provided to move the pencil toward the nearest edge of the tape to make a cross mark 24 whenever the forestalling lever 21 is operated. When this lever is operated it closes the circuit for the solenoid 23 at the contacts 26 as disclosed in said application. It also closes contacts 27 and 28 which through mechanism disclosed in said application forestalls an automatic operation of the brakes by well-known mechanism represented by the rectangle 30. The forestalling lever 21 may be operated at any time to record any item of information on the tape but the construction is such that it will also function to forestall an automatic application of the brakes when the mechanism indicated by the reference character 30 is controlled by a stop signal.

Mounted on a panel 32 in the engineman's cab are a series of signal lights which may be arranged as indicated in the drawing and which comprise a red light, a yellow light, closely spaced yellow and green lights, and a green light. Other types of distinctive signals may be used and my invention is applicable to such types. These signal lights are energized under control of trains on the right of way by control mechanism indicated by the rectangle 33 and which is also old and well known. In the patent to Randolph 2,164,473 July 4, 1939, this part of the mechanism is also disclosed diagrammatically and a single pencil is provided for recording the signals in the cab. In that construction the marks made by the pencil are located in different zones on the tape and in order to interpret the marks the zone in which the mark appears must be clearly identified, and any error in the point of marking caused by the tape being misapplied or by any other cause may lead to misinterpretation of the record. In order to prevent any confusion in reading the recording of the signals on the tape, I have provided three pencils 35, 36, and 37 which record continuously the operations of the signals red, yellow and green respectively in red, yellow and green color and record the combination signals yellow and green in yellow and green colors. The points of these pencils are all arranged substantially on the same transverse line as the pencils 20, 15 and 18 in order that the marks made by these pencils may also be identified with points and sections along the right of way. It is obvious that other colors may be substituted if desired for reasons of legibility or otherwise, but preferably the colors actually used and appearing in the signals in the cab should be used to reproduce the signal phases as they appear from time to time.

These pencils may be operated by means of solenoids 40 connected in parallel with the respective signal lights. Each pencil is supported in a pencil head 45 Fig. 2 which is pivoted on a bracket 46 supported on the end of the solenoid 40, and the pencil is moved about its pivot by the movable core 47 of the solenoid which is provided with an extension pivotally connected to the pencil head. In the case of the pencils 36 and 37 which are operated not only respectively when the yellow and green signal lights are operated but also when the yellow and green combination signals are operated, the solenoids comprise two windings 48 and 49. The windings 48 are connected in parallel respectively in the circuits which operate the yellow and green lights and the windings 49 are connected in parallel in the circuit, which operates the combination yellow and green lights. By means of this construction each of the signals red, yellow and green when operated separately will be recorded on the tape and the yellow and green signals when operated in combination will be recorded on the tape and by the same pencils that record the separate yellow and green signals. In the systems in which only three signal lights, red, yellow and green are provided, the windings 49 and circuits therefor are omitted and the yellow and green pencils are operated in combination when the yellow and green lights are operated in combination.

On the tape disclosed in Fig. 1 and which tape is fed toward the right, are shown recordings, reading from right to left, of green, yellow and green, yellow, and red signals in successive order, and speed and cut-off curves indicating the speed at which the locomotive traveled and the position given to the cut-off mechanism. The rate of speed permissible may be different for different trains and there may also be signals or etc., along the right of way which the engineman should take into consideration.

It is clear now that I have provided means for automatically and continuously recording on a tape the character of signal or signals appearing in the cab and for recording them in such a position on the tape that they may be identified with points along the right of way and also so that the speed of the locomotive and the position of the cut-off at the time such signals were recorded may be clearly and definitely obtained from the tape. By using colored pencils for recording the colored signals it will be necessary to use only a very small zone on the tape for such recording as the marks are distinguished by color and not by position on the tape. It is also obvious that if for any reason it is found desirable and in case it is permissible, the pencils which are not operated in combination can be alined with each other longitudinally of the tape so that the zone required for recording can be made still narrower than the zone required in the case where the three pencils are alined transversely of the tape.

It is obvious that since the pencil or pencils corresponding to the signal light or signal lights appearing in the cab instrument from time to time as the locomotive proceeds over the road, are reproduced continuously and in actual color (unless for some reason arbitrary colors or other distinctive marks are desired), and since the speed of the locomotive and the cut-off are also recorded with such other records as may be desired, tape with these records on it furnishes a continuous reproduction of the exact safety signal phases as the lights appear before the engineman from moment to moment, thus mirroring what he saw before him and by reference to the speed, cut-off and forestalling records, gives an accurate index of the engineman's alertness to the cautionary signals and how the locomotive was handled and operated by him, all of these elements in the record being definitely identified with and tied to the points on the right-of-way, in reference to which the question of locomotive operation may be raised.

While I have illustrated and described a preferred embodiment of my invention, it is to be understood that this has been done for disclosure only and that I reserve the right to all such changes as fall within the principles of my invention and the scope of the appended claims.

I claim:

1. In a recording apparatus for a locomotive, in combination with a distance tape and means for recording the speed of the locomotive on the tape, color signals on the locomotive, and means for making a record of operated signals on the tape in colored lines corresponding to the colors of the operated signals and of a length corresponding to the distance traveled by the locomotive during the operation of the signals and at points on the tape transversely of the sections of the speed curve indicating the speed at that time.

2. In a recording apparatus for a locomotive, in combination with a distance tape and means for recording the speed of the locomotive on the tape, color signals on the locomotive, and means for making a record of operated signals on the tape in colored lines corresponding to the colors of the operated signals and of a length corresponding to the distance traveled by the locomotive during the operation of the signals and on sections of the tape corresponding to the sections along the right of way in which said signals were operated.

3. In a recording apparatus for a locomotive, in combination with a movable distance tape and means for recording the speed of a locomotive on the tape, color signals on the locomotive, color markers corresponding to said signals arranged in line transversely of said tape, means for operating said signals singly and in combination, and means for operating corresponding markers correspondingly singly and in combination continuously during operation of said signals to make a record of operated signals on the tape in colored lines corresponding to the colors of the operated signals and of length corresponding to the distance travelled by the locomotive during the operation of the signals and at points on the tape transversely of the sections of the speed curve indicating the speed at that time.

4. In a recording apparatus for a locomotive, in combination with a movable distance tape and means for moving said tape in accordance with the distance traveled by the locomotive, colored signals on the locomotive, colored markers corresponding to said colored signals arranged in line transversely of said tape, means for operating the signals singly and in combination, and means for operating corresponding markers correspondingly singly and in combination continuously during operation of said signals to make a record of operated signals on the tape in colored lines corresponding to the colors of the operated signals and of lengths corresponding to the distance traveled by the locomotive during the operation of the signals and at points on the tape transversely of the sections of the tape corresponding to the sections along the right of way in which said signals were operated.

5. In a recording apparatus for a locomotive, in combination with a distance tape and means for driving said tape so that the travel of the tape is in proportion to the distance traveled by the locomotive, color signals on the locomotive, and means for making a record of operated signals on the tape in colored lines corresponding to the colors of the operated signals and of a length corresponding to the distance traveled by the locomotive during the operation of the signals and on sections of the tape corresponding to the sections along the right of way in which said signals were operated.

6. In a recording apparatus for a locomotive, in combination with a movable distance tape and means for moving said tape in accordance with the distance traveled by the locomotive, distinctive cautionary signals on the locomotive, distinctive markers corresponding to said signals arranged in line transversely of said tape, means for operating the signals singly and in combination, and means for operating corresponding markers correspondingly singly and in combination continuously during operation of said signals to make a record of operated signals on the tape in distinctive lines corresponding to the operated signals and of lengths corresponding to the distance traveled by the locomotive during the operation of the signals and at points on the tape transversely of the sections of the tape corresponding to the sections along the right of way in which said signals were operated.

7. In a recording apparatus for a locomotive, in combination with a distance tape and means for driving said tape so that the travel of the tape is in proportion to the distance traveled by the locomotive, distinctive cautionary signals on the locomotive, and means for making a record of operated signals on the tape in lines corresponding to the operated signals and of a length corresponding to the distance traveled by the locomotive during the operation of the signals and on sections of the tape corresponding to the sections along the right of way in which said signals were operated.

WM. BELL WAIT.